United States Patent
Hanus et al.

(10) Patent No.: US 8,088,312 B2
(45) Date of Patent: Jan. 3, 2012

(54) METHOD OF REMOVING THE POLYMER ENCAPSULATING A NUCLEAR FUEL PELLET

(75) Inventors: Eric Hanus, Manosque (FR); Olivier Fiquet, Venelles (FR); Nicolas Tarisien, Venelles (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 0 days.

(21) Appl. No.: 13/056,225

(22) PCT Filed: Jul. 23, 2009

(86) PCT No.: PCT/FR2009/000913
§ 371 (c)(1),
(2), (4) Date: Jan. 27, 2011

(87) PCT Pub. No.: WO2010/012886
PCT Pub. Date: Feb. 4, 2010

(65) Prior Publication Data
US 2011/0127473 A1    Jun. 2, 2011

(30) Foreign Application Priority Data
Jul. 28, 2008    (FR) ..................... 08 04273

(51) Int. Cl.
*C09K 11/04*    (2006.01)
*G21G 4/00*    (2006.01)
*C01G 43/025*    (2006.01)

(52) U.S. Cl. ........ 252/643; 110/237; 110/250; 110/346; 423/261; 588/19; 588/405; 588/406; 588/410

(58) Field of Classification Search .................. 252/643; 423/261; 110/346, 237, 250; 422/186; 588/311, 588/405, 406, 410, 19, 205, 213, 226, 228
See application file for complete search history.

(56) References Cited

FOREIGN PATENT DOCUMENTS
GB    2328784 A    3/1999
WO    WO 01/90633 A3    11/2001

OTHER PUBLICATIONS

Sing AK et al "Processing of uranium oxide and silicon carbide based fuel using polymer infiltration and pyrolysis" Journal of Nuclear Materials, vol. 378, No. 3, Sep. 1, 2008, p. 238-243.NL.
International Search Report from European Patent Office.

*Primary Examiner* — Ling Choi
*Assistant Examiner* — Bijan Ahvazi
(74) *Attorney, Agent, or Firm* — Dennemeyer & Assoc.

(57) ABSTRACT

Method for removing the epoxy and/or phenolic polymer encapsulating a nuclear fuel pellet comprising uranium dioxide $UO_2$, the method comprising the following successive steps: a) the polymer is pyrolysed in a reducing atmosphere; and b) the carbon residues obtained after the pyrolysis step (a) are selectively oxidized, the oxidation being carried out at temperature above 1000° C. in an atmosphere comprising carbon dioxide $CO_2$. Such a method makes it possible to remove the epoxy and/or phenolic polymer encapsulating the pellet while avoiding or limiting the risk of radiological contamination by the formation of $U_3O_8$.

6 Claims, 1 Drawing Sheet

METHOD OF REMOVING THE POLYMER ENCAPSULATING A NUCLEAR FUEL PELLET

FIELD OF THE INVENTION

This invention pertains to the field of nuclear fuel treatment.

In particular, it relates to the treatment, before or after their irradiation, of nuclear fuel pellets which are encapsulated within a polymer for the purpose of their characterization in metallographic studies.

BACKGROUND OF THE INVENTION

The microstructure of a nuclear fuel pellet is determined in metallographic studies using techniques such as optical microscopy or electron microscopy.

For such studies, it is necessary to prepare the pellet by encapsulating it with a polymer such as an epoxy and/or phenolic polymer and/or polyester.

Once the studies have been carried out, the polymer, if some remains on the pellet, is irradiated by the ionizing radiation emitted by the nuclear fuel. It then degrades through a radiolysis reaction, whose products are in particular explosive gases, such as hydrogen, oxygen and methane.

For the purposes of shipping, storing and warehousing the pellet, it is therefore necessary to remove the polymer encapsulating all or part of the nuclear fuel pellet in order to suppress the risk of explosion, reduce the volume of waste that can be constituted by the encapsulated pellet, and avoid the polymer's neutron moderator effect in cases where the pellet is reused as a nuclear fuel.

Outside the nuclear field, different methods are available for the removal of a polymer. Thus, in the field of plastic processing, the polymer covering the matrix used for the injection molding of a part is removed using a thermal treatment in which the polymer is pyrolyzed in the presence of an oxidizing gas.

This pyrolysis generates volatile byproducts, which are easily removed through post-combustion in an auxiliary oven. However, it also generates solid residues, the destruction of which requires an additional step of air oxidation.

A pyrolysis treatment, when applied to a nuclear fuel pellet comprising uranium dioxide $UO_2$, should allow as thorough a removal as possible of the polymer, but also of the solid residues that are generated by pyrolysis and which remain in contact with the pellet, since radiolyzing such residues may also generate explosive gases.

However, a treatment which combines pyrolysis and oxidation steps has the drawback of oxidizing $UO_2$ into $U_3O_8$. This transformation is accompanied by a strong increase in the volume of the crystal lattice (by approximately 36), which the sintered pellet cannot accommodate. This leads to significant cracking and swelling of the pellet, thereby resulting in its fragmentation and the generation of $U_3O_8$ powder.

However, $U_3O_8$ in powder form has the drawbacks that it can be disseminated in the air and cause the total release of the fission gases that were initially contained in the nuclear fuel pellet (such as Krypton 85), with both phenomena increasing the risks of radiological contamination.

SUMMARY OF THE INVENTION

It is accordingly one of the objects of this invention to provide a method for removing a polymer (or any residue originating therefrom) encapsulating a nuclear fuel pellet comprising uranium dioxide $UO_2$, such a method being capable of avoiding or strongly limiting the generation of $O_3O_8$ powder as a source of radiological contamination.

The subject matter of the present invention thus relates to a method for removing the epoxy and/or phenolic polymer encapsulating a nuclear fuel pellet comprising uranium dioxide $UO_2$.

The method comprises the following successive steps:
a) pyrolyzing the polymer in a reducing atmosphere;
b) performing the selective oxidation of the carbon-based residues obtained after the pyrolysis step (a), the oxidation being carried out at a temperature above 1000° C. (typically in the range between 1000° C. and 1700° C.) in an atmosphere comprising carbon dioxide $CO_2$.

Throughout the present description, by "residues" it is meant any product resulting from the epoxy and/or phenolic polymer pyrolysis reaction. In general, these are solid residues, which are said to be "carbon-based residues", since they contain at least 80% by weight of carbon, which may be linked to oxygen or hydrogen atoms.

As for the term "pyrolysis", it designates a thermal treatment performed in the absence of oxygen.

Preferably, the reducing atmosphere comprises an inert gas (i.e. chemically inert with respect to the chemical species present), such as argon, and hydrogen. The latter preferably represents a proportion lying between 0.5% and 10%, and more preferably approximately 5%, of the volume of the reducing atmosphere.

Advantageously, the pyrolysis is performed at a temperature above 600° C. (typically in the range between 600° C. and 1700° C.) in order to reduce the amount of residues and residual hydrogen.

The oxidation step (b) is selective in that it is capable of oxidizing the carbon-based residues resulting from the pyrolysis step (a), while avoiding or strongly limiting the oxidation of $UO_2$ into $U_3O_8$. This step could also, when appropriate, be performed under an atmosphere which further comprises carbon monoxide CO, this gas having the advantage of preventing the generation of $U_3O_8$.

Generally, the nuclear fuel pellet treated by the method according to this invention is constituted mainly of uranium dioxide $UO_2$. However, when metallographic studies are performed on a nuclear fuel pellet of the MOX type ("Mixed OXide fuel"), the method of this invention may also be carried out for removing the polymer encapsulating a nuclear fuel pellet that further comprises plutonium dioxide $PuO_2$.

Other objects, features and advantages of the present invention will become more apparent from the following description, which is given by way of non-limiting example with reference to the appended FIGS. 1 and 2.

DETAILED DESCRIPTION OF PARTICULAR EMBODIMENTS

Figure 1:
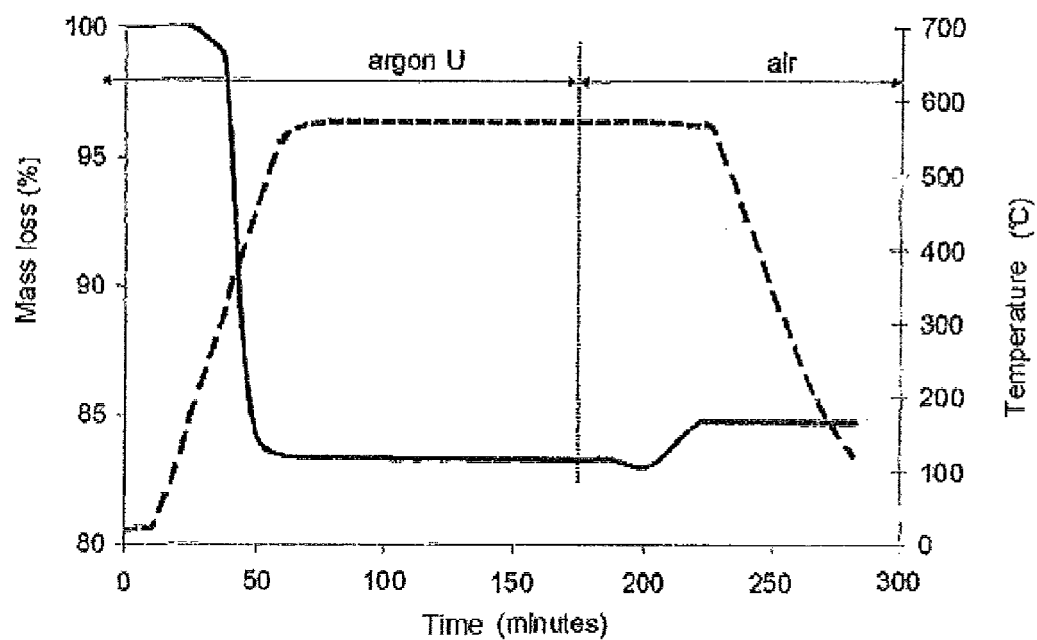
FIG. 1 is a graph showing the variation in mass as a function of time of a $UO_2$ pellet encapsulated with an epoxy polymer, when the pellet is subjected to pyrolysis under argon U, followed by oxidation in air.

The following detailed description relates to the removal of an epoxy polymer encapsulating a pellet of uranium dioxide $UO_2$.

Experiments performed in parallel (not shown here) provide similar results when the polymer is a phenolic polymer.

1—Manufacture of Encapsulated Pellet Samples.

Uranium dioxide $UO_2$ obtained by a "wet process" is compressed and then sintered under a reducing atmosphere so as to obtain a pellet with a density of 10.96 g/cm³.

The pellet is then placed in a mold, and thereafter encapsulated by casting an epoxy polymer (DGEBA polymer—bisphenol A diglycidyl ether—marketed by STRUERS as EPOFIX).

After hardening of the polymer, the encapsulated pellet is cut by means of a wire saw and one of its faces is finely polished (mirror finish) to allow possible microscope observation.

The pellet is 8 mm in diameter and 3 mm in thickness. It is made of 1.05 g of $UO_2$ and 0.23 g of epoxy polymer.

Samples of the encapsulated pellet are placed in a thermobalance (model STA 409 C available from NETZSCH), which allows the change in mass of a sample subjected to a predefined temperature under a controlled atmosphere to be monitored continuously.

2—Treatment of Encapsulated Pellet Samples

Various methods are implemented to remove the epoxy polymer encapsulating the samples manufactured as above.

2.1—Implementation of the Method of the Invention

This exemplary embodiment of the method according to this invention underlines in a comparative fashion, the advantages provided by the pyrolysis step of the invention with respect to pyrolysis under oxidizing conditions.

As a reference, a first sample is pyrolyzed at 600° C. for 2 hours in a slightly oxidizing atmosphere consisting of industrial grade argon (argon U, with impurity contents, expressed in ppm by volume, listed in Table 1).

TABLE 1

| $N_2$ | $O_2$ | $CO_2$ | $H_2O$ | $H_2$ | CnHm |
|---|---|---|---|---|---|
| <20 ppm | <5 ppm | <5 ppm | <5 ppm | <10 ppm | <5 ppm |

This sample is then subjected to oxidation at 1000° C. for 1 hour in an atmosphere composed of carbon dioxide.

A second sample is treated according to the method of this invention: pyrolysis at 600° C. for 2 hours in a reducing atmosphere composed of argon, comprising 5% by volume of hydrogen, followed by oxidation at 1000° C. for 1 hour under an atmosphere composed of carbon dioxide (under the same oxidation conditions as for the first sample).

Following these treatments, both samples no longer contain any residues and maintain their mechanical integrity.

However, only the second sample, having been subjected to pyrolysis in a reducing atmosphere according to the method of this invention, does not show any significant mass gain, which would reveal gradual oxidation of the $UO_2$ into $U_3O_8$. Such a mass gain (expressed in mass percent with respect to the pyrolyzed sample's mass) is indeed negligible, since it is 0.1% (as opposed to 0.5% for the first sample pyrolyzed under argon U).

2.2—Oxidation Step

To illustrate the advantages achieved by the oxidation step alone according to the present invention, two separate treatments are performed. However, these treatments differ from the method according to the present invention in that the pyrolysis step is not performed in a reducing atmosphere.

Two samples are subjected to the same pyrolysis under slightly oxidizing conditions (600° C. for 2 hours under argon U), and then to oxidation performed under different conditions for each sample, namely:

the first sample is oxidized at 600° C. for 45 minutes in an atmosphere composed of reconstituted air (20% oxygen and 80% nitrogen, by volume)

the second sample is oxidized, according to the method of the present invention, at 1100° C. or 1200° C. or 1350° C., for 1 hour in an atmosphere composed of carbon dioxide.

FIG. 1 shows the mass variation of the first sample with time.

Figure 2:
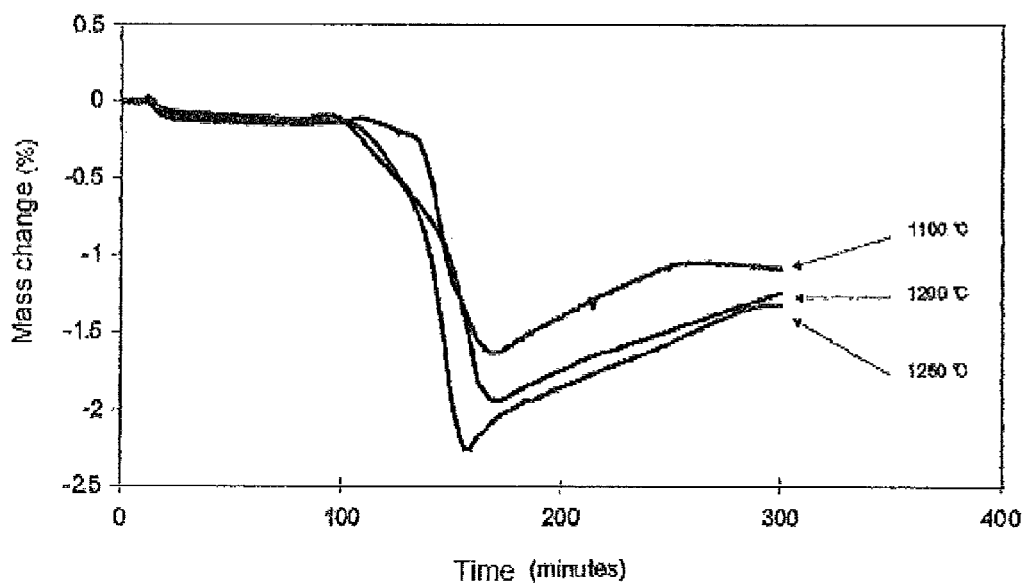
FIG. 2 is a graph showing, for different temperatures, the change in mass as a function of time for the same pellet pyrolyzed in argon U, when it is subjected to oxidation under $CO_2$.

FIG. 2 shows this variation for the second sample, as well as the temperature applied as a function of time (dashed lines). However, it does not illustrate the pyrolysis step performed in argon U because this step is identical to that shown in FIG. 1. The mass variation it shows is therefore that of the sample after it has been pyrolyzed in argon U.

When analyzing FIGS. 1 and 2, the following differences between oxidation in air and oxidation in $CO_2$ appear clearly.

As apparent from FIG. 1, pyrolysis in argon U removes a large proportion of the polymer (with a mass loss of the encapsulated pellet of the order of 17%).

Thereafter, when oxidizing the residues in air, the mass loss continues at a moderate rate until it reaches 200 minutes of treatment. It is quickly compensated by a mass gain estimated to be 3.2% with respect to the sample's mass before pyrolysis. This is due to the gradual oxidation of $UO_2$ into $U_3O_8$, the latter being an oxide of higher molecular weight. This observation is confirmed by the sample's appearance, which is now entirely in the form of a powder.

As previously mentioned, it is therefore not possible to oxidize the pyrolysis residues in air without at the same time transforming the sintered $UO_2$ pellet into $O_3O_8$ powder.

When the oxidation step is performed in $CO_2$ (see FIG. 2), for all of the temperatures under consideration, a mass loss occurs, which is related to the oxidation of the residues (after 100 minutes). Experiments performed at other temperatures (not shown here) show that this oxidation becomes complete only at a temperature above 1000° C., this temperature also having the advantage of enhancing the stability of $UO_2$ with respect to $U_3O_8$.

This mass loss is followed by a mass gain due to the $UO_2$ pellet oxidation, which leads to the formation of $U_3O_8$ powder (after 150 minutes).

However, the mass fractions of $U_3O_8$ powder are then much smaller than the aforementioned values since, for temperatures of 1100° C., 1200° C. and 1350° C., they are 1.7%, 2.1% and 1.4%, respectively, with respect to the sample's mass after pyrolysis. Such values are insufficient to jeopardize the mechanical integrity of the sintered pellet, whereas the oxidation treatment in air results in the sample being entirely transformed into a powder.

When comparing both treatments, it therefore appears that the oxidation step according to the present invention, namely oxidation under $CO_2$ at a temperature above 1000° C., leads to complete oxidation of the residues while strongly limiting the formation of $U_3O_8$ powder.

As shown in the above description, the method according to the present invention allows the epoxy and/or phenolic polymer encapsulating a nuclear fuel pellet comprising uranium dioxide $UO_2$ to be removed, while at the same time limiting or even avoiding the risk of radiological contamination through the formation of $U_3O_8$ powder.

The invention claimed is:

1. A method for removing the epoxy and/or phenolic polymer encapsulating a nuclear fuel pellet comprising uranium dioxide ($UO_2$), the method comprising the following steps:

a) pyrolyzing said polymer in a reducing atmosphere;
b) performing the selective oxidation of the carbon-based residues obtained after the pyrolysis step (a), said oxidation being carried out at a temperature above 1000° C. in an atmosphere comprising carbon dioxide ($CO_2$).

2. The method according to claim 1, wherein said reducing atmosphere comprises an inert gas comprised of argon and hydrogen.

3. The method according to claim 2, wherein the hydrogen represents a proportion lying between 0.5% and 10% of the volume of said reducing atmosphere.

4. The method according to claim 1, wherein said pyrolysis is performed at a temperature above 600° C.

5. The method according to claim 1, wherein said oxidation is performed in the atmosphere which further comprises carbon monoxide (CO).

6. The method according to claim 1, wherein said pellet further comprises plutonium dioxide ($PO_2$).

* * * * *